United States Patent Office 2,920,488
Patented Jan. 12, 1960

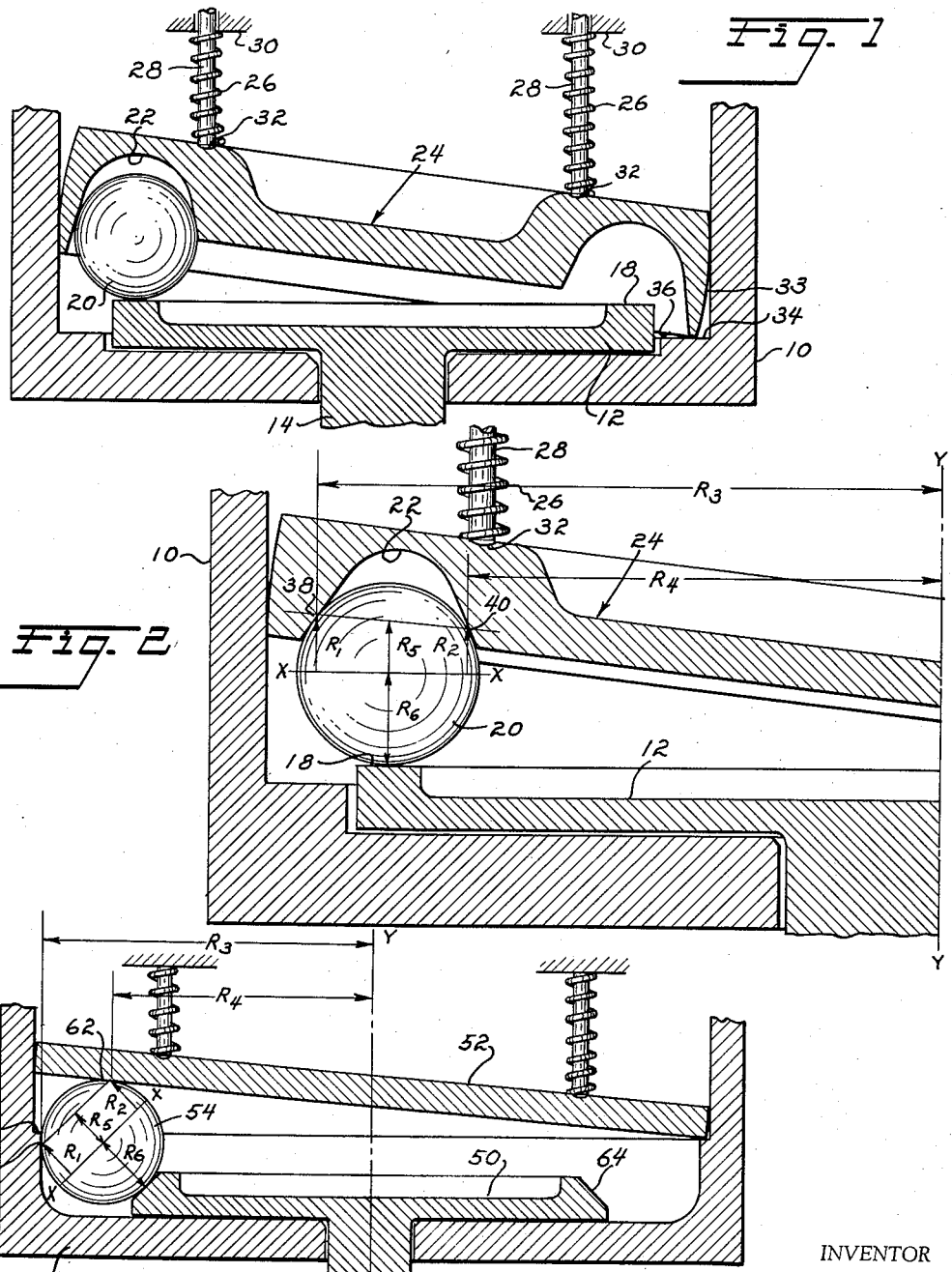

2,920,488

MOTION TRANSLATING AND SPEED REDUCING MECHANISM

Russell C. Savage, Elyria, Ohio, assignor to Bendix-Westinghouse Automotive Air Brake Company, Cleveland, Ohio, a corporation of Delaware Application September 11, 1958, Serial No. 760,486

7 Claims. (Cl. 74—60)

This invention relates to mechanical movements and more particularly to an improved means for translating rotary motion to linear reciprocatory motion.

A principal object of the present invention is to provide a novel means for translating rotary to reciprocatory motion through the medium of a rollable member interposed between a driving rotary member and a wobble-plate which is adapted to be nutated about its axis as the rollable member is driven in engagement therewith by the rotary member, a principal feature of the invention residing in the elemination of any slip between the three members while at the same time effecting a speed reduction between the speed of nutation of the wobble-plate and the speed of rotation of the driving-plate, the speed reduction being capable of being established between wide limits without the use of any auxiliary speed reduction mechanism such as, for example, gears and the like.

It is another object of the invention to provide mechanism of the character set forth in the foregoing paragraph which is susceptible of a wide variety of uses as, for example, the actuation of levers and linkages, or the driving of pistons for compressors, pumps, and the like.

Other objects and their attendant advantages will become apparent as the following detailed description is read in conjunction with the accompanying drawings wherein:

Fig. 1 illustrates schematically one embodiment of the present invention;

Fig. 2 is enlarged detailed view of the embodiment of Fig. 1;

Fig. 3 represents schematically a second embodiment of the present invention.

Figure 4:
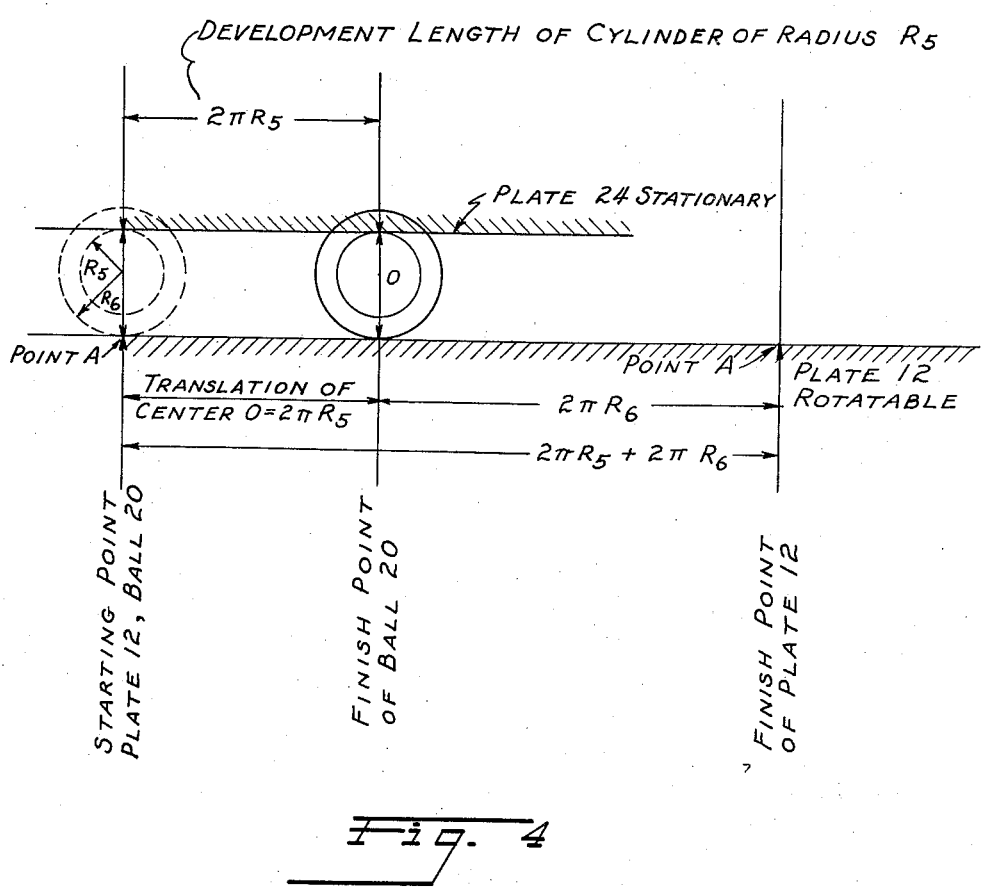
Fig. 4 is a diagrammatic view illustrating the theory of operation of the present invention.

Referring now to Fig. 1, the embodiment of the invention there shown comprises a housing 10 suitably recessed to receive a rotating member 12 having a central shaft 14 adapted to be driven by an external power source (not shown) in either direction. The rotating member 12 has an annular planar friction surface 18 driveably supporting a rollable member such as the ball or sphere 20. The ball 20 is retained in its position atop the surface 18 by means of an annular groove 22 in the lower surface of a nutating wobble-plate 24 which is urged in the direction of the rotating plate by resilient means such as the schematically shown springs 26 which are symmetrically arranged about the axis of the plate 24 so as to uniformly urge the plate 24 on all sides in the direction of plate 12, the sphere 20 causing the plate 24 to tilt upwardly against the pressure of the springs as the sphere is moved in the groove 22 by rotation of driving plate 12. For purposes of illustration, the springs 26 are shown surrounding actuating rods 28 whose upper ends may project through fixed abutments 30 to be connected to members to be actuated, as for example, levers or pump pistons or the like. The lower ends of the actuating rods may have a socket connection with the upper surface of plate 24 as schematically shown at 32, the upper surface of the plate 24 forming a lower movable abutment for springs 26 as will be familiar to those skilled in the art.

To permit the plate to be guided in its nutation in housing 10, the peripheral edge 33 may be curved as shown so as not to jam against the inner wall of housing 10 during nutation. The interior of housing 10 may be provided with an annular shoulder or shelf 34 which may be engaged by a depending annular skirt 36 as the plate is nutated.

For maximum efficiency, it is desirable that there be no inherent slip between the driving plate, the ball, and its points of engagement with the sides of the groove 22. Referring now to Fig. 2, it is there shown how the members should be arranged to prevent slip. With a planar driving surface 18 on the driving member, the sphere 20 should roll about an axis parallel to the driving surface. In Fig. 2 the rolling axis is designated by the line X—X, and the points of engagement of the ball with the groove sides are indicated at 38 and 40 respectively, the points 38, 40 being the upper ends or the point of tangency of segments of the sphere having respective chordal radii R1 and R2 normal to the rotating axis X—X. If the radii R1 and R2 bear the same relation to each other as the radii R3 and R4 between the axis of nutation Y—Y and the points of contact 38, 40, it will be apparent to those skilled in the art that when the ball rotates about axis X—X, the segments defined by radii R1 and R2 will likewise rotate about the axis X—X and hence there will be no slippage between any of the points of contact of the ball with driving-plate 12 or with nutating plate 24.

So long as the ratio $R1/R2=R3/R4$ is maintained, the radii R1 and R2 can be varied in length by regulating the width of groove 22 so that the radii extend only slightly beyond the axis X—X on the one hand or extend considerably above the axis on the other. The average distance that the radii extend beyond the axis X—X determines the speed reduction between the speed of rotation of plate 12 and the cyclic rate of nutation of the plate 24; that is to say, with a short average radius (designated R5 in Fig. 2) the ball will move relatively slowly beneath plate 24 thus producing a large speed reduction between plates 24 and 12 whereas with a longer average radius the ball will move with a relatively greater orbital speed with respect to plate 24 thus producing less speed reduction whose limit, of course, is a two-to-one reduction where a theoretical flat nutating plate would rest on the ball's greatest diameter.

The theory of speed reduction will become fully understood if for purposes of illustration it is assumed that a disc having a radius R6 is substituted for the ball 20 and that the assumed disc has concentrically mounted on the inner side thereof a second disc of diameter R5. Assume that plate 24 is flat and has its peripheral edge resting on the upper edge of the smaller disc while the periphery of the larger disc is engaged by the driving-plate 12. This arrangement is illustrated in Fig. 4. Now, when plate 12 has moved so as to rotate the disc of radius R5 one revolution, it will be apparent that the total distance advanced by the smaller disc in relation to the edge of the nutating plate will be $2\pi R5$. However, in moving the smaller diameter disc one revolution the larger diameter disc will also turn one revolution so that a point on its periphery will travel a total distance of $2\pi R6$. In order for the rotating driving member 12 to turn the smaller disc of radius R5 one revolution, it must travel a distance equal to the advance of the smaller disc, that is, $2\pi R5$, plus the total distance traveled by a point on the periphery of the larger disc. Thus a point A on the driving member 12 must travel a distance equal to $(2\pi R5 + 2\pi R6)$ to produce one revolution of the smaller diameter disc. Since the smaller disc only advances a distance of $2\pi R5$ it will be apparent that the small disc's travel or speed must be related to the driving member travel or speed as $2\pi R5$ is related to $(2\pi R5 + 2\pi R6)$ or expressed mathematically:

$$Bs/Ds = R5/(R5+R6)$$

where $Bs$ is the speed of advance of the ball (corresponding to the speed of advance of the small diameter disc in the above illustration) and $Ds$ is the speed of advance of the driving disc 12.

From the foregoing, it should now be apparent that when the average radius R5 of the points of contact 38, 40 is small relative to the ball radius R6, a relatively large speed reduction will be obtained between the driving-plate 12 and the speed of advance of the ball which determines the cyclic rate or speed of nutation of the wobble-plate. For example, if R5 is .25" and R6 is 1", then the speed reduction equals .25/1+.25 or a 1 to 5 reduction so that the drive plate must turn five times for every revolution of the ball about the plate axes. It should be apparent that for a greater value of R5, the speed reduction is decreased with the upper limit being substantially 1 to 2 when R5 equals R6 in which event the edge of the wobble-plate would be resting directly on top of the ball.

The arrangement illustrated in Fig. 3 is substantially the same as that described above except that in lieu of an annular groove in the wobble-plate, this member is flat and the ball rides between the wall of the housing and a sloping surface on the driving-plate. In Fig. 3 the driving-plate, wobble-plate, and ball are designated respectively by the numerals 50, 52, and 54. The housing is designated by the numeral 56 and is provided interiorly with an annular shelf 58 engaged by the down side of the wobble-plate. The ball 54 engages the wall of housing 56 at point 60 and engages the wobble-plate at the point 62. The desired rotating axis X—X of the ball will be along that ball diameter where radii R1, R2 extending respectively from the points of contact 60, 62 to the diameter bear the same relationship to each other as do the radii R3, R4 extending from the axis of the driving-plate to the points of contact 60, 62. The slope of this diameter, which is the desired rolling axis X—X of the ball, determines the slope of the driving surface 64 of plate 50 which surface must be parallel to the rotating axis if the ball is to be driven without slip at any of its points of contact. Speed reduction will be determined exactly as in the case of the arrangement of Figs. 1 and 2, that is to say, $$Bs/Ds = R5/(R5+R6)$$

where $Bs$ is the speed of advance of the ball and $Ds$ is the speed of advance of a point on the driving-plate.

It will be apparent that the speed ratio of the arrangement in Fig. 3 can be pre-selected by changing the lengths of radii R1, R2 so that they continue to bear the same relation to each other as do the radii R3, R4. Changes in the length of R1, R2 will define a non-slip rotating axis X—X whose slope will determine the slope of the driving face 64 of plate 50 to produce the desired speed reduction.

It is believed that from the foregoing, further description of the operation of the mechanism of the invention is not required. It will be apparent to those skilled in the art that in lieu of the single ball illustrated in the drawings two or more balls connected to each other in close adjacency, as by conventional cages utilized in ball bearing assemblies, could be substituted. Two balls would impart increased stability to the wobble-plate without in any way affecting the theory or mode of operation of the invention. It will be apparent to those skilled in the art that these and other changes may be resorted to without departing from the scope of the appended claims.

What is claimed is:

1. A motion translating device comprising a driving-plate having an annular friction surface, a wobble-plate resiliently urged in the direction of said driving-plate, a spherical member interposed between said plates and adapted to be rolled by said driven plate about a rolling axis parallel to the plane of said friction face, said wobble-plate engaging said spherical member on a sector thereof having a chordal radius which when measured normal to the rolling axis is less than the greatest radius of said member so that said member has a translatory motion with respect to said engaged wobble-plate which has less than one-half the speed of the engaged friction face of said driving-plate.

2. A motion translating device comprising a driving-plate having an annular friction surface rotatable about an axis, a wobble-plate resiliently urged in the direction of said driving-plate, a rollable member interposed between the friction surface of said driving-plate and the opposed surface of said wobble-plate, said rollable member being adapted to be rolled by said friction surface between it and said wobble-plate about an axis parallel to said friction surface, said wobble-plate engaging said spherical member at a point on the inner side of a plane extending through the center of said rollable member normal to its rolling axis, annular guide means engaging said member on the outer side of said plane normal to the rolling axis, the points of engagement of said wobble-plate and said guide means with said rollable member defining sectors having chordal radii which when measured normal to the rolling axis are less than the greatest radius of said member, the outer radius being greater than the inner radius and related to the inner radius in the same ratio as the respective distances of the points of engagement from the axis of said driving-plate.

3. A motion translating device comprising a driving-plate having an annular friction surface rotatable about an axis, a wobble-plate resiliently urged in the direction of said driving-plate, said wobble-plate having an annular groove in substantial registration with said friction surface, said groove having inner and outer side walls diverging in the direction of said friction surface, ball means riding on said friction surface and received in said groove so as to engage the walls thereof, said ball means being adapted to be rolled by said driving-plate about an axis parallel to said friction surface, the sides of said groove engaging said ball means on respective sectors thereof having chordal radii which when measured normal to the rolling axis are less than the greatest radius of said ball so that said ball has a translatory motion with respect to said engaged wobble-plate which has less than one-half the speed of the engaged friction face of said driving-plate.

4. The motion translating device of claim 3 wherein the outer sector chordal radius is greater than the inner sector chordal radius in the same ratio as the distance of the respective sectors from said axis.

5. A motion translating device comprising a driving-plate having an annular friction surface rotatable about an axis, a wobble-plate resiliently urged in the direction of said driving-plate, an annular race fixed with respect to said driving and wobble-plates, ball means riding on said friction surface and engaging said wobble-plate and said race, said ball means being adapted to be rolled by said driving-plate about an axis parallel to said friction surface, the points of engagement of said ball means with said race and said wobble-plate defining sectors having chordal radii which when measured normal to said rolling axis are less than the greatest radius of said ball means so that said ball means has a translatory motion with respect to said engaged wobble-plate which has less than one-half the speed of the engaged friction face of said driving-plate.

6. The motion translating device in accordance with claim 5 wherein the chordal radius of the sector defined by the race is greater than the chordal radius of the sector defined by the wobble-plate in the same ratio as the distances of the respective engaged points of said ball means from said axis.

7. The motion translating device in accordance with claim 6 wherein the radii define the rolling axis of said ball means and the friction surface of said driving-plate is parallel to said defined rolling axis.

References Cited in the file of this patent

FOREIGN PATENTS

| | | |
|---|---|---|
| 475,262 | Great Britain | Nov. 16, 1937 |
| 515,359 | Germany | Jan. 2, 1931 |